US012515887B2

(12) United States Patent
Uriarte

(10) Patent No.: US 12,515,887 B2
(45) Date of Patent: Jan. 6, 2026

(54) APPARATUS AND METHOD FOR CREATING SPACINGS BETWEEN INDIVIDUAL GROUPS OF CONVEYED GOODS DURING SIMULTANEOUS TRANSPORT OF THE GROUPS OF CONVEYED GOODS

(71) Applicant: CELLUMATION GMBH, Bremen (DE)

(72) Inventor: Claudio Uriarte, Bremen (DE)

(73) Assignee: CELLUMATION GMBH, Bremen (DE)

(*) Notice: Subject to any disclaimer, the term of this patent is extended or adjusted under 35 U.S.C. 154(b) by 143 days.

(21) Appl. No.: 18/283,218

(22) PCT Filed: Mar. 22, 2022

(86) PCT No.: PCT/EP2022/057559
§ 371 (c)(1),
(2) Date: Sep. 21, 2023

(87) PCT Pub. No.: WO2022/200392
PCT Pub. Date: Sep. 29, 2022

(65) Prior Publication Data
US 2024/0174452 A1    May 30, 2024

(30) Foreign Application Priority Data
Mar. 22, 2021   (DE) .................... 10 2021 107 087.2
Mar. 22, 2021   (LU) ........................................ 102682

(51) Int. Cl.
*B65G 43/08* (2006.01)
*B65G 47/08* (2006.01)
*B65G 47/30* (2006.01)

(52) U.S. Cl.
CPC ............. *B65G 43/08* (2013.01); *B65G 47/08* (2013.01); *B65G 47/30* (2013.01)

(58) Field of Classification Search
None
See application file for complete search history.

(56) References Cited

U.S. PATENT DOCUMENTS 6,401,936 B1 * 6/2002 Isaacs .................... B65G 43/08
198/367.1
6,471,044 B1 * 10/2002 Isaacs .................. B65G 47/682
198/460.1

(Continued)

FOREIGN PATENT DOCUMENTS

DE           19927251 A1    1/2001
DE      102015117241 A1    4/2017

(Continued)

OTHER PUBLICATIONS

International Search Report and Written Opinion issued in corresponding International Patent Application No. PCT/EP2022/057559 (with English translation of International Search Report) dated Jul. 8, 2022 (16 pages).

*Primary Examiner* — Kavel Singh
(74) *Attorney, Agent, or Firm* — Kilyk & Bowersox, P.L.L.C.

(57) ABSTRACT

The invention relates to a method establishing distances (d) between a first conveyed-good unit (11) and a second conveyed-good unit during the simultaneous transport of the conveyed-good units in a conveying direction (z), comprising the following steps:
Feeding of a plurality of at least the first conveyed-good unit (11) and the second conveyed-good unit in a first arrangement, wherein the first conveyed-good unit (11) and the second conveyed-good unit are fed in sections simultaneously in the conveying direction (z), and wherein the conveyed-good units of the conveyed good (Continued)

Figure 1:
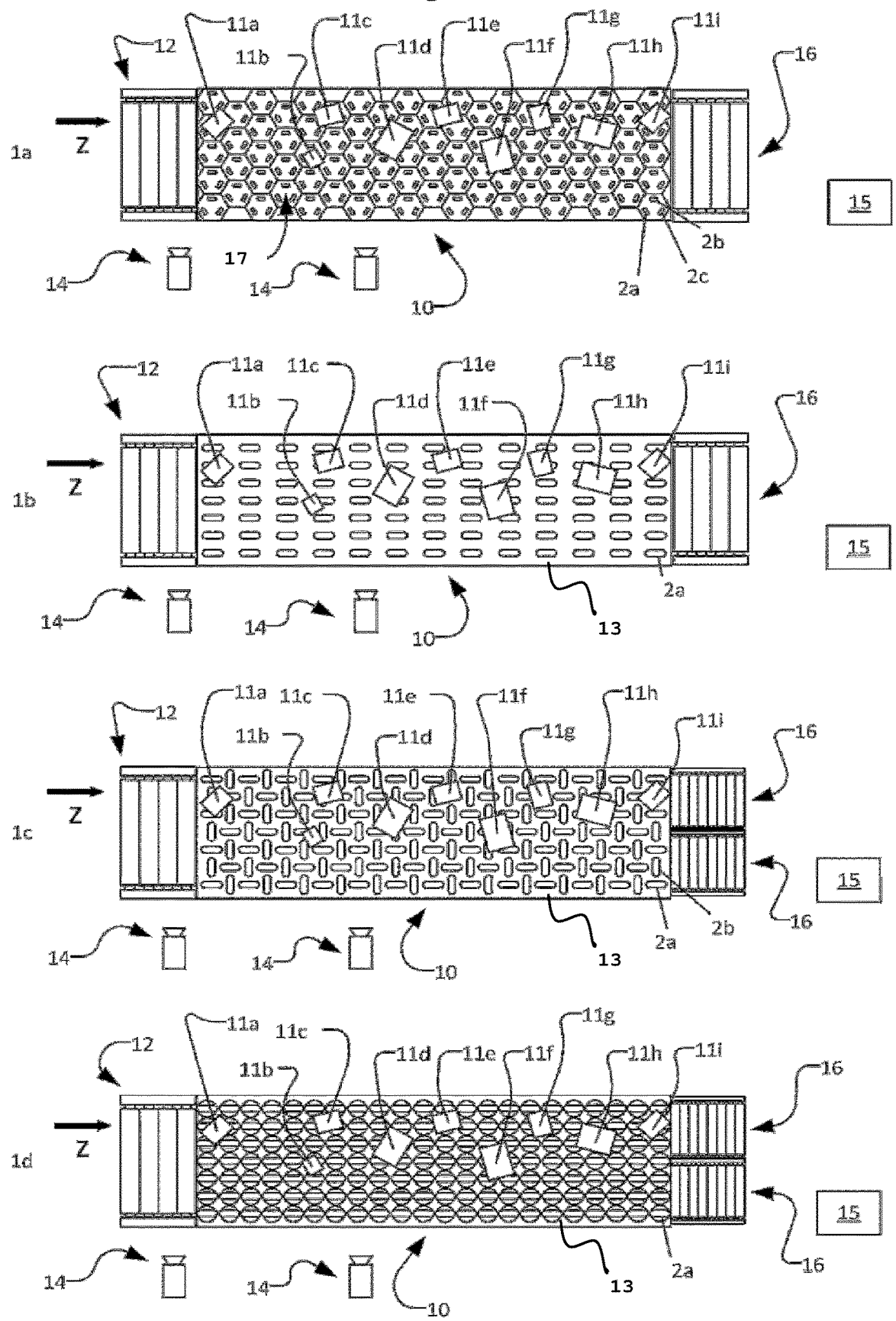

are fed orthogonally offset to each other in relation to the conveying direction (z) and have a first distance to one another, typifying detection (S1) of the conveyed-good units (11), determining a target position of the first conveyed-good unit (11a . . . 11d) and the second conveyed-good unit (S2), controlling or regulating a target distance (d) between the first conveyed-good unit (11a . . . 11d) and the second conveyed-good unit on the basis of the said target position (S3), and for this purpose, moving the first conveyed-good units (11a . . . 11d) (S4) and the second conveyed-good unit using conveyor drives (2, 2a . . . 2c), which can move one or a plurality of conveyed-good units individually and in a variable manner in any direction of the conveying plane, in such a way that a target distance (d) between the first conveyed-good units (11a . . . 11d) and the second conveyed-good unit exists at the point of transfer to a subsequent conveyor section (16), wherein the target distance (d) is different from the first distance, the movement is dependent on control signals generated from the typifying detection (S1) of the first conveyed-good unit (11a . . . 11d) and the second conveyed-good unit and generated from the determination of the target positions of the first conveyed-good unit (11a . . . 11d) and the second conveyed-good unit (S2), wherein the first conveyed-good unit and the second conveyed-good unit are transported simultaneously in the conveying direction (z).

15 Claims, 4 Drawing Sheets

(56) References Cited

U.S. PATENT DOCUMENTS

| | | | |
|---|---|---|---|
| 6,629,018 B2 * | 9/2003 | Mondie | B65G 47/28 700/229 |
| 6,694,220 B1 | 2/2004 | Tanz | |
| 6,910,569 B2 * | 6/2005 | Reznik | B65G 27/34 198/444 |
| 7,090,067 B2 * | 8/2006 | Schiesser | B65G 47/2445 198/395 |
| 7,861,847 B2 * | 1/2011 | Fourney | B65G 17/24 198/433 |
| 8,201,681 B2 | 6/2012 | Schiesser et al. | |
| 9,085,422 B2 * | 7/2015 | Cristoforetti | B65G 47/22 |
| 9,790,035 B2 | 10/2017 | Neiser et al. | |
| 10,486,915 B2 * | 11/2019 | Kim | B65G 43/10 |
| 10,647,522 B1 | 5/2020 | Watson | |
| 10,906,746 B2 * | 2/2021 | Schroader | B65G 47/1492 |
| 11,459,188 B2 * | 10/2022 | Schroader | G05B 19/05 |
| 11,947,346 B2 * | 4/2024 | Uriarte | G05B 19/4189 |
| 12,012,291 B2 * | 6/2024 | Elmardini | B65G 47/31 |
| 2004/0104100 A1 | 6/2004 | Schiesser et al. | |
| 2013/0037388 A1 | 2/2013 | Faist et al. | |
| 2017/0100749 A1 | 4/2017 | Hartmann et al. | |
| 2020/0109011 A1 | 4/2020 | Fourney | |
| 2021/0002079 A1 | 1/2021 | Mader | |

FOREIGN PATENT DOCUMENTS

| | | |
|---|---|---|
| DE | 102018113678 A1 | 12/2019 |
| EP | 2059467 B1 | 10/2010 |
| EP | 2874923 A1 | 5/2015 |
| EP | 3357839 A1 | 8/2018 |
| WO | 2011131573 A1 | 10/2011 |
| WO | 2019175195 A2 | 9/2019 |

* cited by examiner

4b

4a

APPARATUS AND METHOD FOR CREATING SPACINGS BETWEEN INDIVIDUAL GROUPS OF CONVEYED GOODS DURING SIMULTANEOUS TRANSPORT OF THE GROUPS OF CONVEYED GOODS

This application is a National Stage Application of PCT/EP2022/057559, filed Mar. 22, 2022, which claims priority to German Patent Application No. 10 2021 107 087.2, filed Mar. 22, 2021 and to Luxembourg Patent Application LU 102682, filed Mar. 22, 2021.

The invention relates to a device and a method for establishing distances between individual conveyed-good units while simultaneously transporting the conveyed-good units, in particular, in production environments and in logistics.

BACKGROUND

In modern plant construction as well as in conveyor systems, logistical objects such as boxes, containers, trays, pallets, etc., as well as workpieces or workpiece carriers are transported by means of material flow systems. These systems consist of a mechanical structure, electrical wiring and a control system to control the drive and thus flow velocities.

Modern material flow systems are usually mechanically modular. A conveyor system is generally composed of a plurality of different conveyor sections that are connected interactively. These conveyor sections are usually many times larger than an object to be conveyed, such as a conveyor belt or a driven roller conveyor for example, on which a plurality of objects can be placed simultaneously.

An exemplary material flow system is known from international application WO 2011/131 573 A1.

Particularly with the ever-increasing online and mail-order business as well as the increasing importance of globally interdependent supply chains, the logistics and conveyance of parcels and other conveyed goods are a high-tech and complex task. An essential component of these material flow systems are those conveyor sections which, in addition to the underlying transport by, for example, conveyor belts or roller conveyors, carry out sorting of conveyed goods. This can be, for example, a division of the same conveyed goods to different destinations or a sorting of different conveyed goods according to their type, quality or also according to their destination. In most cases, however, the conveyed goods have to be fed in an orderly association for sorting, usually one behind the other in the form of a string of pearls, in single file, so to speak, or in rows or rows running side by side, so that separation takes place first before the real sorting begins.

This results in a plurality of different functions for the separation and sorting sections of the conveyors in order to enable a high conveying throughput, thereby making good productivity of the entire conveyor system possible. However, there is currently no known system that can sort disorderly, non-pre-aligned or at least approximately isolated conveyed goods (from "bulk" feeding). Not only the quantity that such a sorting section can successfully process, but also the quality, for example, the reliability and correctness of the sorting, is determined to a considerable extent by the distances or gaps that exist between the individually conveyed goods in order to carry out the various functions of the sorting section neatly. Here, it is always necessary to optimize between the conflicting requirements for the quality of the sorting on the one hand, where a large distance between the individually conveyed goods are preferred, and the requirements for the flow rate on the other so that sorting does not become a bottleneck for the entire conveyor. For this purpose, the smallest possible gaps between the individually conveyed goods are desirable.

This results in a highly important function of a material flow system upstream of sorting, namely the function of so-called gapping. Gapping is the targeted establishment of predetermined distances or gaps between individual conveyed goods. The gaps or predetermined distances must be established and observed both in the conveying direction as well as transversely to the conveying direction.

In the simplest case, gapping is achieved by manually placing the conveyed goods on a feeder to the sorting station or even on the sorting section itself. The technical term borrowed from English for such laying and separating (possibly coupled with a similar alignment of the conveyed goods) refers to this as "induction". Another simple method is manually establishing sufficient gaps between conveyed goods passing by the operating personnel on a pure transport section of the conveyor system upstream of the sorting section. However, manual manipulation to establish predetermined, sufficient distances between the individually conveyed goods is time-consuming and comparatively slow. The need to carry out gapping automatically and to find appropriate plant-engineering solutions has been and is therefore very high.

Examples of dynamic gapping devices are described in U.S. Pat. No. 8,201,681 B2, U.S. Pat. No. 10,647,522 B1, and US 2020/0109011 A1. Here, in each case, a device or a device section for conveying individually conveyed goods is disclosed, in which the conveying area is divided into a plurality of conveyor belts arranged one behind the other, each of which can operate at different velocities. Depending on the existing distances or dimensions of the individually conveyed goods, the velocity of one or a plurality of the conveyor belts arranged one behind the other can be controlled by a stored control algorithm in such a way that a conveyed good is transported faster or slower in relation to the adjacent conveyed good. In this way, a distance between these two conveyed goods can be increased or decreased. Here, however, the gapping takes place exclusively in the conveying direction.

However, these devices have limitations in multiple respects that are no longer up-to-date in a modern material flow system. On the one hand, spacing only works well if the conveyed goods are inserted into the gapping device one behind the other in a more or less orderly manner. This is due to the fact that sensors must first detect the existing distances or dimensions of the conveyed goods. Above all, however, this is due to the underlying conveyor technology of the different velocities, which can only be applied in the transport direction of the conveyor belts used. In other words, if there is insufficient spacing of the conveyed goods next to each other in the transverse direction to the conveying direction, no manipulation for enlarging the distance can occur. Furthermore, such a gapping system will also not be able to be used in a variable manner for small as well as large conveyed goods, because, if a plurality of conveyed goods can be accommodated together on one of the conveyor belts arranged one behind the other, no sufficient distance between these conveyed goods can also be established due to the different velocities of the conveyor belts. They would then be more likely to be transported faster together.

Another important disadvantage is the large length of the device, which is occupied solely by the conveyor belts arranged one behind the other only to establish distances or gaps between the conveyed goods. The extremely large amount of space required is also not really mitigated by the fact that a plurality of these gapping systems are positioned next to each other, because then, space must be provided behind the multiple system for the conveyed goods to be brought together or crossed.

In accordance with US patent specification U.S. Pat. No. 9,790,035 B2, an attempt is made to address these limitations, at least in part, by using smaller conveyor belts one behind the other in comparison to the above-mentioned systems and controlling and operating them dynamically, i.e., differentially and non-linearly with regard to their velocity.

These problems are well known and there are other gapping-conveyor systems that try to at least partially improve and simplify these processes, or to eliminate the disadvantages mentioned.

A technical gapping device is known from the European patent specification EP 2059467 B1 in which one or a plurality of robots are used to establish sufficient distances between the conveyed goods, which lift individual goods from the main conveyor route, transfer them to a secondary conveyor route and then thread them back into a suitable gap between the goods located on the main conveyor route. This is a very complex and very limited throughput solution for such a gapping system, as the removal and re-routing of the individual goods carried out by the robot(s) is very time-consuming. In addition, this system also takes up a lot of productive space.

Furthermore, the European patent specification EP 1556297 B1 describes a conveying device with handling of the distributed items, which comprises a gapping system with reference number 26, which is formed by adjacent conveyor belts 54a-54h that are not parallel and comparatively short (cf., FIG. 1). By passing through this section, the adjacent individual conveyed goods are not only moved apart in the conveying direction, but also transversely to the conveying direction. However, the distances that can be achieved by such an arrangement are very limited. The directions of the motion vectors that act on the conveyed goods for spacing are also fixed by the fixed orientation of the conveyor belt and cannot be changed subsequently. As a result, the device is very statically only applicable to recurring conveyed goods or conveyor tasks.

As a result, all gapping-conveyor device systems known to date require a very large amount of space, particularly with regard to the distances between the conveyed goods that can be achieved by them. They are also limited in their ability to generate sufficient distances even at a short transport distance and thus in a short period of time. Furthermore, it should be noted that all previously known gapping systems that work with conveyor technology have mechanically fixed directions of movement, which act on the conveyed goods in such a way that they are either moved differentially along the conveying direction or, to a lesser extent, also transversely to the conveying direction. These mechanically fixed directions of movement cannot be changed afterwards without modification of the system. Although the use of robots can remedy this situation, the use of robots, in addition to the high costs and maintenance requirements, is associated with the disadvantage that they are very slow to pick up and set down individually conveyed goods. A high throughput is therefore not achievable. In addition, it should be noted in the case of the known systems that they cannot carry out individual and variable manipulation of individually conveyed goods, particularly if the conveyed goods are not already fed one behind the other, but in a disorderly network with a plurality of goods that are also adjacent to each other at right angles to the conveying direction ("bulk"). Crossing the movement paths of the conveyed goods to be spaced cannot be carried out without requiring a high amount of space.

Object

It is therefore an object of the invention to provide a device and a method which make it possible to establish a specified target distance between conveyed goods in a variable manner, even in the case of non-organized conveyed goods and/or conveyed goods that are individually fed successively, wherein a small amount of space required by the device is to be maintained. For this purpose, the device and the method should preferably make it possible to establish distances between the conveyed goods by moving them (dynamic gapping). In addition, the throughput of the gapping device should be high with a reliable gapping function. Furthermore, it should be possible to change the gapping device or the gapping method without structural modification of the system with regard to the movement possibilities of the conveyed goods on which establishing the distance is based.

Presentation of the Invention

The object is solved by means of a conveyor system for establishing distances d between a first conveyed-good unit and a second conveyed-good unit while simultaneously transporting the conveyed-good units in one conveying direction z, comprising:

a feeding device for feeding at least the first conveyed-good unit and the second conveyed-good unit, wherein the first conveyed-good unit and the second conveyed-good unit comprise a first distance, one or a plurality of subsequent conveyor sections with a plurality of conveyor drives located in the conveying direction z localized one behind the other and next to each other in the conveying direction for the transport of the conveyed-good units at an actual velocity, detection means for the typifying detection of the individual conveyed-good units, means of determining a target position of the first conveyed-good unit and the second conveyed-good unit, a control system/regulator for controlling or regulating a target distance d between the first conveyed-good unit and the second conveyed-good unit on the basis of the said target positions, characterized in that the conveyor drives are designed and arranged in such a way that they can jointly move the individual conveyed-good units in any direction on the conveying plane, individually or in a plurality in such a way that target distance d between of the first conveyed-good unit and the second conveyed-good unit exists at the time of its transfer to a subsequent conveyor section, wherein the target distance is different from the first distance, wherein the conveyor drives are each driven individually by means of a motor and can be controlled individually by the control system/regulator, and wherein:

the detection means can send a signal to the control system/regulator with information on the characteristics of the first conveyed-good unit and the second conveyed-good unit, the control system/regulator receives signals of the means for determining a target position of the first conveyed-good unit and the second conveyed-good unit and, depending on these signals, identifies and outputs control/regulating signals to the conveyor drives for moving the first conveyed-good unit and the second conveyed-good unit to the target position in such a way that the first conveyed-good unit and the second conveyed-good unit can be moved individually and in a variable manner in each direction of the conveying plane by the conveyor drives to establish the target distance d, wherein the first conveyed-good unit and the second conveyed-good unit are simultaneously transported in the conveying direction (z).

A target distance d can be predefined and, for example, have a certain size. However, the target distance can also depend on one or a plurality of parameters of the conveyed-good unit(s). For example, it can be provided that a different (larger) target distance d should result for a large conveyed-good unit and/or fast conveyed-good unit than for a small conveyed-good unit and/or slow conveyed-good unit. For example, depending on the size/velocity of the conveyed-good unit, the dimensions for the calculation can be scaled at a factor greater than 1, e.g., 1.1, before the distance is calculated. It can also be taken into account if a conveyed-good unit is rather elongated, i.e., if the ratio of the sides (length/width) is, for example, greater than 2 or less than 0.5. An example of a target distance selected in relation to parameters of the conveyed-good units is a fraction of the shortest side length of a conveyed-good unit, preferably the shortest side length of the first and/or second conveyed-good unit.

A conveying direction can be understood both as a local conveying direction, e.g., on the basis of one or a plurality of adjacent conveyed-good units, or globally between a feeding device and a desired exit point (e.g., the end of a conveyor section of the conveyor system) without excluding other definitions.

With the device according to the invention, it is favourably possible to establish a specified target distance between the conveyed goods in a variable manner even in the case of non-organized conveyed goods and/or conveyed goods that are not successively fed individually. Furthermore, a small amount of space required by the device can be maintained, because, due to the movement of the conveyed goods individually and in a variable manner in each direction of the conveying plane, the movements for establishing the distance can be carried out without requiring a long distance to be covered. Thus, the device according to the invention has the ability to establish sufficient distances even at a short transport distance and thus in a short period of time. In addition, the device according to the invention can individually establish the required distances between the conveyed goods by moving them (dynamic gapping). There is no restriction on the movement direction, in particular, on the movement direction when moving apart so that a movement direction and its path length can be calculated and executed individually for each conveyed good. In addition, the velocity of the conveyance can be individually adjusted; it can even be negative, if, for example, a single conveyed good has to be crossed past other conveyed goods or crossed past their movements without collision along its path in order to reach its target position. This is not possible with previously known systems.

In addition, the throughput of the gapping device is very high with a reliable gapping function since the individual gapping movements of the conveyed goods are carried out with the conveyor system according to the invention in a very small space in comparison to the previously known systems. Furthermore, the device according to the invention can also be changed without structural modification of the system with regard to the movement possibilities of the conveyed goods on which establishing the spacing is based.

The present invention relates to a conveyor system for establishing distances between individual conveyed-good units while simultaneously transporting the conveyed-good units in one conveying direction z, which can also be referred to as gapping in technical terms. Essentially, two functions are fulfilled simultaneously for subsequent sorting, accurate detection or spaced further transport through the device with its devices: On the one hand, the conveyed goods are transported in the conveying direction z, and on the other hand, the conveyed goods are manipulated in such a way that they have a sufficient distance d from each other for subsequent steps. The conveying direction z can run along a straight line but can also depict a non-straight path that comprises, for example, curves, curvatures and/or changes of direction.

The conveyor system according to the invention comprises a feeding device for feeding a plurality of conveyed-good units. The feeding device can be both an active transporting device and a non-active transporting device. For example, a feeding device can be formed from a table or a workstation for operating personnel, on the other hand, a feeding device can be formed, for example, from a chute or a driven or non-driven belt or roller conveyor.

For the purposes of the present invention, conveyed goods are understood to mean general cargo in particular. Conveyed-good units can be packed or unpacked units. Preferably, these are goods packed in cartons, envelopes or films or goods carriers such as trays and small-load carriers. The conveyed-good units can be of the same type, in particular, conveyed-good units of the same size. However, it is preferable to use different types of conveyed-good units, particularly those of different dimensions.

For the purposes of the present invention, the first and second conveyed-good units can be considered in particular to be any two adjacent conveyed-good units.

Furthermore, a plurality of individual conveyed-good units can be fed to the conveyor sections via the feeding device, either in an orderly but preferably disorderly manner ("in bulk"). If the conveyed-good units are fed in an orderly manner, they can be fed in a row one behind the other and/or next to each other. Preferably, however, the conveyed-good units are not fed one behind the other while being lined up one behind the other. Particularly preferably, it has to do with more than 50 conveyed-good units per minute, more than 100 conveyed-good units per minute, more than 150 conveyed-good units per minute, or more than 200 conveyed-good units per minute, which are fed by the feeding device to the subsequent conveyor sections.

The term bulk refers to a plurality of disorderly conveyed-good units. In particular, it is a loose collection of conveyed-good units, which can vary in shape, dimensions, weight and nature (e.g., surface, material). The position and orientation of a single conveyed-good unit within the "bulk" does not have to follow a defined arrangement. A single conveyed-good unit can be in contact with one or a plurality of other conveyed-good units or the conveyed-good units can overlap. For example, the conveyed-good units have completely different distances from each other, and they can come into contact with each other, or, for example, they can comprise different orientations of their main axes that do not point in the conveying direction.

The device according to the invention further comprises one or a plurality of subsequent conveyor sections with a plurality of conveyor drives arranged one behind the other and next to each other in the conveying direction z for transporting the conveyed-good units at an actual velocity.

The conveyor section(s) are arranged in the conveying direction adjacent to the feeding device in such a way that they pick up the conveyed-good units from the feeding device and transport them in the conveying direction z. At least for the purpose of transporting the conveyed-good units, according to the invention, a plurality of conveyor drives are provided for each conveyor section, which are localized next to each other and one behind the other in the conveying direction z.

In the context of the present invention, a conveyor drive is understood, in particular, to be a device via which a motion impulse is transmitted to a conveyed-good unit in such a way that it is moved in the conveying direction and in another direction of the conveying plane. This variable movement can be determined and executed by a conveyor drive individually or by a plurality of conveyor drives working together.

Examples of a conveyor drive, particularly in relation to the contact surface of the conveyed-good unit, are smaller than these rollers that are driven by a motor. In this case, one motor can drive one roller but also a plurality of coupled rollers, for example two or three rollers, which together form a conveyor drive. In other words, the conveyor drives can also be driven either in groups and/or controlled or regulated in groups. In particular, it is preferable to conveyor drives, such as those known as motorized omni wheels or as mecanum wheels in conveyor technology for example. In the case of omni wheels, also known as omnidirectional wheels, the running surface of the wheel consists of rollers whose rotational axes are at an angle to the rotational axis of the main wheel. Similar to an omni wheel is the special shape of the mecanum wheel, in which the rollers are mounted at an angle to the main axis (usually 45°). As a result, the rotation of the wheel and the rotation of the rollers cannot be decoupled from each other.

According to the present invention, by arranging the conveyor drives in the conveying direction side by side and one behind the other and by aligning the conveyor drives accordingly, it is achieved that the conveyed-good units can be moved individually in different directions in order to establish a target distance between them and simultaneously, the conveyed-good units are transported further to one or a plurality of parallel subsequent section(s). Preferably, the conveyor drives are not a conveyor belt and not rotating discs, wherein the term disc refers to the contact surface for the conveyed-good units, and not rotatable balls.

The conveyor drives can transport the conveyed-good units individually or in a plurality in the conveying direction. According to the invention, the conveyor drives can also move the conveyed-good units in a variable manner in each direction of the conveying plane in addition to the transport in the conveying direction, wherein the conveyor drives work together individually or in a plurality of drives. In the context of the present invention, the concept of movability in any direction of the conveying plane is understood, in particular, to mean that a conveyed-good unit can be moved both in the conveying direction and at a variable angle deviating from the conveying direction, such as, for example, in a first subsection of the conveyor section in a 90° direction, i.e., transversely, to the conveying direction, in a further subsection then 20° to the conveying direction, and in a subsequent subsection 5° to the conveying direction. The motion vector that deviates from the conveying direction can therefore be dynamically adjusted, both in terms of its changeability in direction as well as with regard to its size and thus in the acceleration or velocity of the conveyed-good units. It can even be provided that the velocity of the movement of the conveyed-good units in the conveying direction is slowed down by the conveyor drives or even reversed (negative velocity).

A target distance d can be predefined and, for example, have a certain size. However, the target distance can also depend on one or a plurality of parameters of the conveyed-good unit(s). For example, it can be provided that a different (larger) target distance d should result for a large conveyed-good unit and/or fast conveyed-good unit than for a small conveyed-good unit and/or slow conveyed-good unit. For example, depending on the size/velocity of the conveyed-good unit, the dimensions for the calculation can be scaled at a factor greater than 1, e.g., 1.1, before the distance is calculated. It can also be taken into account if a conveyed-good unit is rather elongated, i.e., if the ratio of the sides (length/width) is, for example, greater than 2 or less than 0.5. For example, a certain fraction of the shortest side length of a conveyed-good unit can be defined as the target distance d for the distance between the closest points of the first and second conveyed-good units, such as a quarter of the shortest side length, one third of the shortest side length, one fifth of the shortest side length, one tenth of the shortest side length. A range can also be provided for the target distance d, for example, between one tenth of the shortest side length and one quarter of the shortest side length. The target distance d should be selected, in particular, taking into account the provided average conveying velocity in relation to the conveying direction z (and thus the provided throughput of the conveyor system with regard to time).

In the context of the present invention, by the term "detection means for the typifying detection of the individual conveyed-good units," it is understood to mean both actively as well as non-actively detection means. In particular, as an active detective means, one or a plurality of means for detecting geometry, contour, height, labelling, height contour, colour, machine-readable optical markings, human-readable optical markings, machine-readable radio-based markings, such as cameras, depth cameras (3D cameras), other optical sensors, radio receivers or ID readers for reading printed codes, e.g., barcode scanners, QR code scanners, etc. for example, are understood. In the same way, preferably stored data that can also be read on a data carrier or in a control system concerning the conveyed-good units, in particular, regarding their geometry, contour, height, labelling, height contour, colour, marking, or concerning their possibly predetermined target distances when feeding to the conveyor system according to the invention can be included and serve as non-active detection means.

In the context of the present invention, the term "typifying detection" is understood, in particular, to mean that not all possible parameters of a conveyed-good unit that can be detected are detected in each case, but rather that the detection of a characteristic or marking or a parameter is sufficient to determine a conveyed-good unit in such a way that its movement for the creation of a target position and thus target distance to its adjacent conveyed-good units is determined and the movement can be carried out by the device according to the invention. Outlines, object types, colours, volumes, lengths or even just the distances between adjacent conveyed-good units can be detected.

Furthermore, for example, tables with information on conveyed-good unit types can be stored in the control system, which contain a preferred movement of the conveyed-good unit type. It is also conceivable that the typifying detection recognizes a conveyed-good unit and writes it into an empty table field, thereby creating a new conveyed-good unit type.

The conveyor system according to the invention also comprises means for determining a target position of a conveyed-good unit. In the context of the present invention, the term means for determining a target position is understood to mean, in particular, stored data that can be read in a control system or on a data carrier, which, for example, on the basis of a defined algorithm or dynamically on the basis of detected actual positions of the conveyed-good units in the area of the feed or at the beginning of the subsequent conveyor section or, preferably, on the basis of the typification detection of the conveyed-good units, a target position at the end of the conveyor section.

Furthermore, the conveyor device according to the invention comprises a control system/regulator for controlling or regulating a target distance d between individual conveyed-good units on the basis of the respective individual said target positions.

According to the invention, it is now provided that the conveyor drives are designed and set up in such a way that they can move the individual conveyed-good units in any direction on the conveying plane in such a way that the target distances d between the conveyed-good units exist at the time of transfer to a subsequent conveyor section, wherein
  the conveyor drives are each driven individually by means of a motor and can be controlled individually by the control system/regulator, and wherein:
  the detection means can send a signal to the control system/regulator with information on the characteristics of the individual conveyed-good unit, the control system/regulator receives signals from the means for determining a target position of the conveyed-good unit and, depending on these signals, determines and outputs control/regulating signals to the conveyor drives for moving the individual conveyed-good units to the target position in such a way that the conveyed-good units are can be moved in each direction in an individually variable manner on the conveying plane by the conveyor drives for establishing the target distance d.

Thereby, the core of the invention is the interaction of the conveyor drives driven individually or in groups and controllable individually or in groups using the control system/regulator, which, depending on the signals of the detection means and the means of determining a target position, move the conveyed-good units in such a way that they establish the required distances between the individual conveyed-good units. The conveyor drives can move the conveyed-good units individually or in interaction with a plurality of drives in any direction of the conveying plane, even against the conveying direction z.

Interacting conveyor drives can preferably be arranged together in drive modules. For example, a drive module can comprise two, three, four, five, six, seven, eight, nine or ten conveyor drives. The conveyor drives arranged in a drive module, or their motors can each be driven and controlled individually. Preferably, however, the conveyor drives of a drive module are controlled and driven in such a way that they cumulatively transmit a specified movement direction and a specified acceleration to a conveyed-good unit.

In a preferred embodiment of the invention, the conveyor drives are arranged in a plurality of drive modules so that one drive module comprises two or three or four conveyor drives each. The conveyor drives of a drive module can be driven either individually or in groups, particularly in groups of two or three coupled omni wheels, by means of a controllable motor.

In a further preferred embodiment of the invention, the rotational axes of the conveyor drives of a drive module are arranged either parallel or, preferably, not parallel to each other.

In particular, if three conveyor drives with their respective conveying directions are arranged at an angle of 60° to each other, a conveyor module can move a conveyed-good unit in any direction of the conveying plane. As a result, a movement can even be transmitted in a very small space and executed by the conveyed-good unit. As a result, the space required by the conveyor system according to the invention can be kept at a very low level compared to previously known gapping systems.

Alternatively, or cumulatively, the rotational axes of the conveyor drives of a drive module are not arranged parallel to the conveying direction in a further embodiment.

For example, the conveyor drives can be formed from rotatable conveyor drives. In this case, it is not necessary to combine the individual conveyor drives into conveyor modules. An interaction of the rotatable conveyor drives can be brought about by a control system in such a way that, in this case, an individual movement of the conveyed-good unit in any desired direction of the conveying plane is equally possible while simultaneously transporting the conveyed-good units to a subsequent conveyor section.

In a preferred embodiment of the conveyor system according to the invention, the conveyor drives are smaller than the contact surface of a conveyed-good unit.

In this embodiment, in particular, it is also possible to impress the conveyed-good units individually for both a movement in the conveying direction as well as a movement at a variable angle to the conveying direction by means of conveyor drives fixed in a carrier plate or in one or a great plurality of carrier modules. As a result, the device can not only perform a fast and reliable gapping function with a very low space-requirement level, but it can also be adapted to different requirements regarding the conveyed-good units without modifications.

In a preferred embodiment of the invention, the conveyor drives of the first conveyor section are rotatably mounted.

Examples of rotatable conveyor drives include driven rotating rollers, discs, wheels or small-format bands or belts. In particular, the conveyor drives in this embodiment can be individually rotated in a controlled manner.

As a result, the variability of the movement that can be transferred to the conveyed-good units by the conveyor drives can be greatly increased compared to the previously known systems.

In a preferred embodiment of the present invention, the detection means for the typifying detection of conveyed-good units are sensors, light barriers, cameras, depth cameras (3D cameras), photodiodes, radar devices, other optical sensors, radio receivers or ID readers for reading printed codes, e.g., barcode scanners, QR code scanners, or combinations thereof.

The detection means can be selected according to the type and possible marking of the conveyed-good units. If, for example, the conveyed-good units include an RFID chip, a corresponding radio detection means can be provided. However, if the conveyed-good units include, for example, colour markings, photodiodes can be used. This also applies, for example, to the detection of contours by means of strips with photodiodes. If the conveyed-good units do not have uniform, recurring markings, it can be more efficient to provide cameras or light barriers as a detection means. Accordingly, one or a plurality of barcode scanners can be used, provided that the conveyed-good units each comprise a barcode.

In an embodiment of the conveyor system according to the invention, the means for determining a target position of a conveyed-good unit are a computer-program product. This can be, for example, a fixed algorithm for calculating the movements required to establish the target distances of the conveyed-good units and their movement velocities. It is equally possible not to provide a fixed algorithm, but a self-learning program, e.g., using an AI routine. The computer-program product can be provided in a centralized or decentralized control system. Preferably, however, it is provided in a central control system. Signals from the detection means for the typifying detection of the individual conveyed-good units are used with the help of the computer-program product to determine a target position of the conveyed-good unit. From this, control signals can then be generated and sent to the controllable conveyor drives so that a movement of the conveyed-good unit required to reach the target position can be carried out by the conveyor drives.

In a further embodiment of the invention which comprises a control system/regulator for controlling or regulating a target distance between individual conveyed-good units on the basis of the said target position, control signals to at least two adjacent, preferably at least three adjacent, more preferably at least four, five or six adjacent conveyor drives. The adjacent conveyor drives can all belong to one conveyor drive module, but they can also belong to different modules and are only adjacent with regard to their position in the conveyor section.

As a result, a very high throughput of conveyed-good units that are conveyed and provided with a target distance from one another can be achieved.

Preferably, in a further embodiment of the invention, the conveyor system according to the invention comprises means of checking the target distances achieved. Like the means of detecting the conveyed-good units, the check can take place and be carried out by sensors, light barriers, cameras, photodiodes, radar devices, ID readers for reading printed codes such as barcode scanners or QR code scanners, or combinations thereof.

In particular, preference is given to the means for checking the target distances achieved not only at the end of the passing conveyor section, but rather in the middle or between the middle and end of the gapping-conveyor section, for example.

In this way, a readjustment can be carried out if a target distance has not yet been fully reached by moving the conveyed-good units along and/or at an angle to the conveying direction.

The invention further relates to a method for establishing distances d between a first conveyed-good unit and a second conveyed-good unit during the simultaneous transport of the conveyed-good units in one conveying direction z, comprising the following steps:

Feeding of a plurality of at least the first conveyed-good units and the second conveyed-good unit in a first arrangement, wherein the first conveyed-good unit (11) and the second conveyed-good unit are fed in sections simultaneously in the conveying direction (z), and wherein the conveyed-good units of the conveyed good are fed orthogonally offset to each other in relation to the conveying direction (z), typifying detection of the conveyed-good units,
determining a target position of the first conveyed-good unit and the second conveyed-good unit,
controlling or regulating a target distance between the first conveyed-good unit and the second conveyed-good unit on the basis of the said target position, and for this purpose, the first conveyed-good unit and the second conveyed-good unit are moved by means of conveyor drives, which can move one or a plurality of conveyed-good units individually and in a variable manner in each direction of the conveying plane in such a way that a the target distance d between the first conveyed-good unit and of the second conveyed-good unit exists at the time of transfer to a subsequent conveyor section, wherein the target distance is different from the first distance, wherein the movement takes place depending on control signals generated from the typifying detection of the first conveyed-good unit and the second conveyed-good unit and generated from the determination of the target positions of the first conveyed-good unit and the second conveyed-good unit, wherein the first conveyed-good unit and the second conveyed-good unit are simultaneously transported in the conveying direction z.

In a preferred embodiment of the method according to the invention, a feeding device feeds a plurality of individual conveyed-good units in bulk.

The term bulk refers to a plurality of disorderly conveyed-good units. In particular, it is a loose collection of conveyed-good units, which can vary in shape, dimensions, weight and nature (e.g., surface, material). The position and orientation of a single conveyed-good unit within the "bulk" does not have to follow a defined arrangement. A single conveyed-good unit can be in contact with one or a plurality of other conveyed-good units or the conveyed-good units can overlap. For example, the conveyed-good units have completely different distances from each other, and they can come into contact with each other, or, for example, they can comprise different orientations of their main axes that do not point in the conveying direction.

This makes the method available for a plurality of applications that currently have an unordered supply of conveyed-good units, and in particular no feed in individual rows one behind the other ("induction"). As a result, considerable savings can be made in terms of required system components, system space requirements and/or manual work.

In one embodiment of the invention, the method additionally comprises the following steps after the typifying detection of the conveyed-good units and/or after determining a target position of the conveyed-good unit:

deciding whether a movement must be executed to create a target position, then
in the event of a "yes" decision: calculating the movement direction and the strength of movement,
in the event of a "no" decision: transporting the conveyed-good unit without additional movement.

As a result, the computational effort of the control system can be reduced, and the method can be executed more quickly.

Further favourable embodiments are the object of the dependent claims and the detailed description.

SHORT DESCRIPTION OF THE FIGURES

Figure 2:
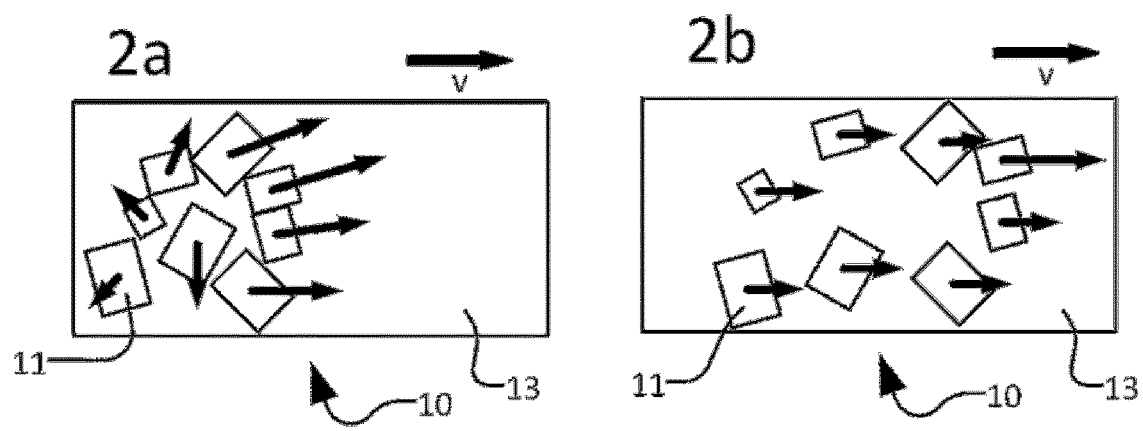
Figure 3:
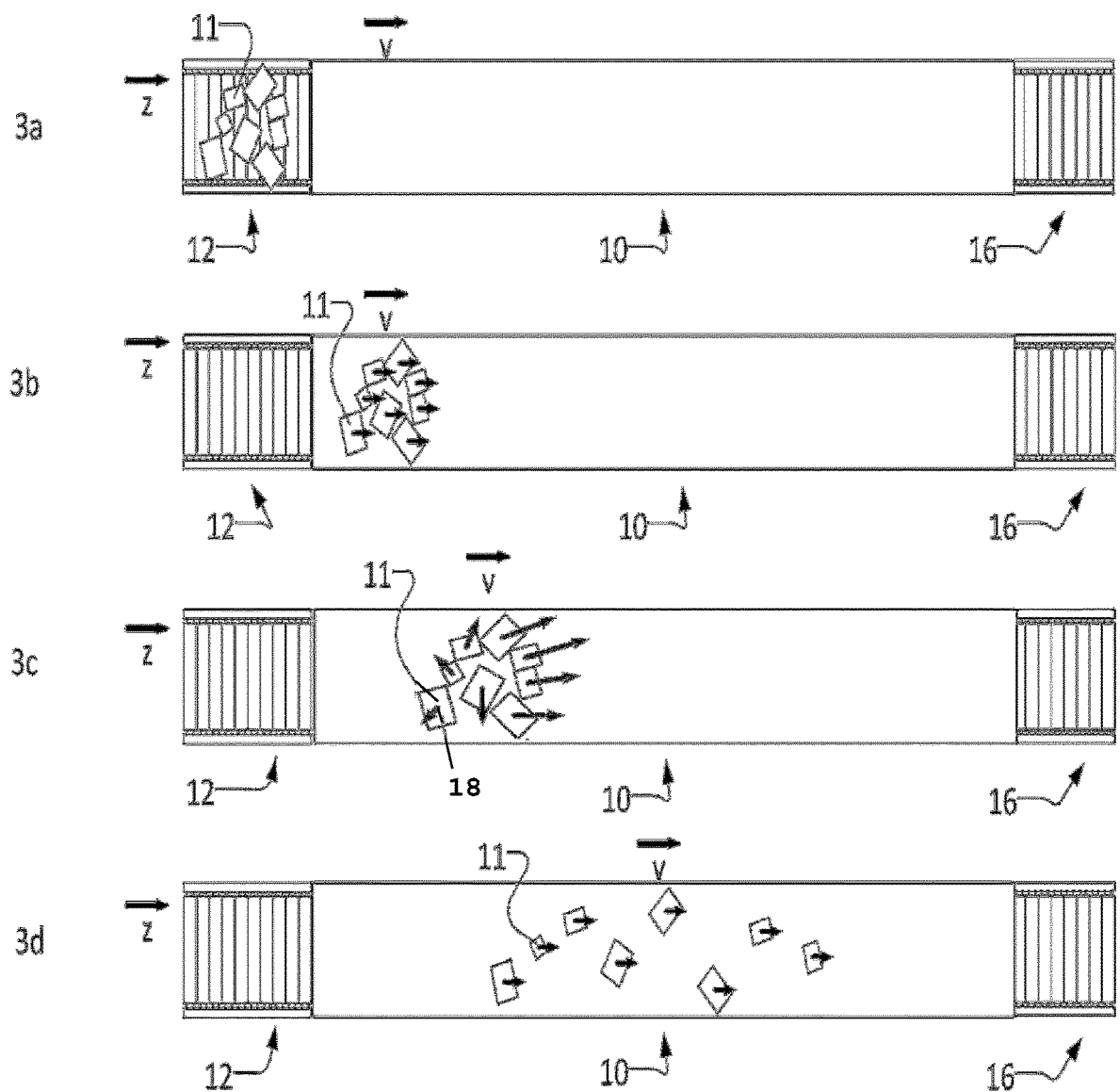
Figure 4:
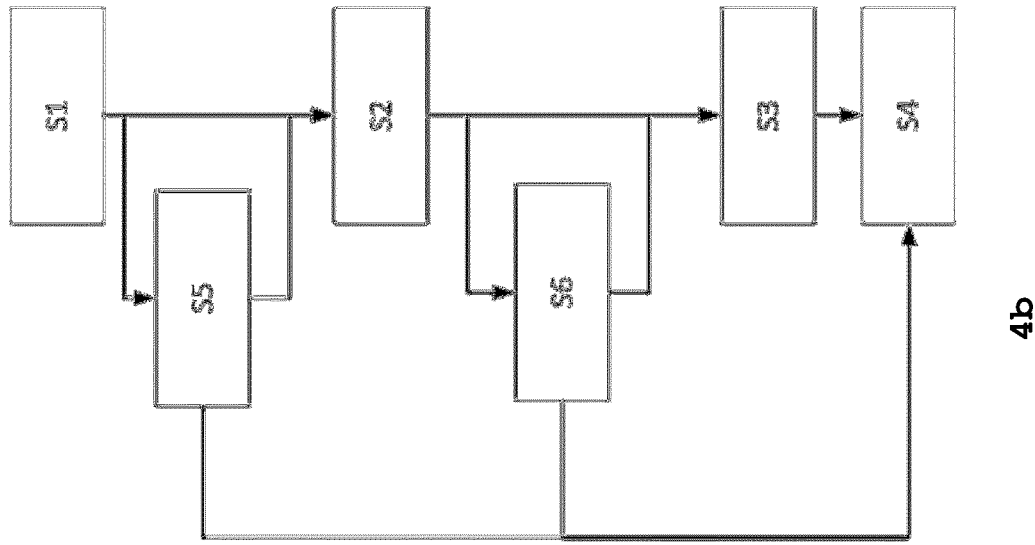
Figure 4:
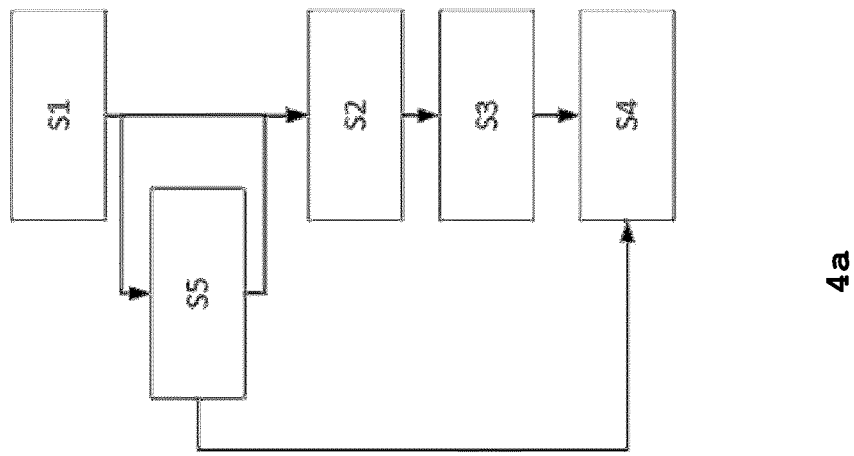

The invention is explained in more detail below with reference to exemplary embodiments shown in the figures. The figures show:

FIG. 1 a highly schematized top view of an embodiment of the conveyor system according to the invention respectively with four different types or arrangements of conveyor drives, FIG. 2 a highly schematized principle illustration of the movements of a plurality of conveyed-good units in a conveyor section of the conveyor system according to the invention, FIG. 3 a further highly schematized illustration of the principle of an embodiment of the present invention on the basis of four temporally successive snapshot illustrations, and FIG. 4 a highly schematized flow chart of two embodiments of a method according to the invention respectively.

In the following, the invention will be described in more detail with reference to the figures. It should be noted that different aspects are described, each of which can be used individually or in combination, i.e., each aspect can be used with different embodiments of the invention unless explicitly presented as a pure alternative.

When describing the components of an exemplary embodiment, terms such as first, second, A, B, (a), (b), and the like can be used. The terms are used only to distinguish the component from other similar components and the nature, sequence or sequential order of the corresponding component is not limited by the terms.

Furthermore, for the sake of simplicity, reference will usually only be made to one entity at a time. However, unless explicitly stated, the invention can also comprise a plurality of the affected entities. In this respect, the use of the words "a" and "one" is to be understood only as an indication that at least one entity is used in a simple embodiment.

FIG. 1 shows, in a highly schematized top layer, a conveyor system 10 according to the invention in four different embodiments 1a, 1b, 1c, 1d of the first conveyor section, each with differently designed conveyor drives 11.

FIG. 1a shows a conveyor system according to the invention 10 for establishing distances d between individual conveyed-good units 11a, 11b, 11c, 11d, 11e, 11f, 11g, 11h, 11i with simultaneous transport of the conveyed-good units in a conveying direction z, which has a feeding device 12 for feeding a plurality of conveyed-good units 11 and a first conveyor section 13. In the conveying direction z, the first conveyor section 13 is followed by a subsequent conveyor section 16. In the embodiment shown, the feeding device 12 and the subsequent conveyor section 16 are represented as a roller conveyor. In the first embodiment shown here, the conveyor section 13 comprises a plurality of conveyed-good units 11a, 11b, 11c, 11d, 11e, 11f, 11g, 11h, 11i which are moved in the conveying direction z. The transport movement of the conveyed-good units 11a, 11b, 11c, 11d, 11e, 11f, 11g, 11h, 11i is carried out by a plurality of conveyor drives 2a, 2b, 2c. The conveyor drives 2a, 2b, 2c are designed as omnidirectional wheels (omni wheels). In the embodiment shown, they are arranged in groups of three in a conveyor drive module 17 in such a way that their directions of rotation are oriented to each other at a 60° angle and form a triangle. Their rotational axes are therefore not parallel to each other, and they do not run parallel to the conveying direction z, each conveyor drive 2 can comprise an individually controllable motor which is communicatively connected to a control system 15 and can receive signals from the control system. In terms of their dimensions, the conveyor drives 2 are smaller than the conveyed-good units 11 to be transported. According to the invention, the motors of the conveyor drives 2 (not shown) can be controlled in such a way that the conveyor drives 2 can work together in a plurality, i.e., in two, three, four, five, etc., to individually move a conveyed-good unit 11 in a variable manner in each direction of the conveying plane. The conveyor drives (2, 2a . . . 2c) can be driven individually or in groups by means of a motor (provided for this purpose).

The positions of the conveyed-good units 11 shown in FIG. 1 represent an exemplary snapshot in which the conveyed-good units 11 are already isolated and exist with a target distance to each other on the conveyor section 13.

In addition to the conveying components, the conveyor system 10 according to the invention also comprises detection means 14 for the typifying detection of the individual conveyed-good units 11. The positions of the two detection means shown here 14 are only exemplary. Preferably, optical sensors, particularly cameras, being particularly preferred, 3D cameras coupled with object recognition software, can be used. These can, for example, be positioned in as central a position as possible, in particular, above the feeding device and/or the first conveyor section 13 as well as in the middle or rear area of the first conveyor section 13. The detection means 14 detect at least the type and the relative position of the conveyed-good units 11 to each other and communicate the detected data to the control system 15. The control system/regulator 15 also receives signals from the means (not shown) for determining a target position of the conveyed-good unit 11a, 11b, 11c, 11d, 11e, 11f, 11g, 11h, 11i so that, depending on these, control/regulating signals are output to the conveyor drives 2, 2a . . . 2c for moving the individual conveyed-good units 11a, 11b, 11c, 11d, 11e, 11f, 11g, 11h, 11i to the target position in such a way that the conveyed-good units 11b, 11c, 11d, 11e, 11f, 11g, 11h, 11i can be moved in a variable manner in any direction in the conveying plane by the conveyor drives 2a, . . . , 2c for establishing the target distance. The detection means 14 positioned in the middle or rear area of the first conveyor section 13 can detect the distances reached up until that point between the conveyed-good units and send them to the control system so that it can be determined in the manner of a control loop whether the target positions have already been reached or whether a further movement of the conveyed-good units must be initiated and executed.

In FIG. 1b, in contrast to FIG. 1a, an embodiment of the conveyor system 10 according to the invention is schematically shown, which has a differently designed conveyor section 13. However, the remaining components are similarly designed. In conveyor section 13, the conveyor system 10 of FIG. 1b, in turn, comprises smaller conveyor drives 2a in relation to the conveyed-good units 11a, 11b, 11c, 11d, 11e, 11f, 11g, 11h, 11i. The conveyor drives 2a are arranged next to and behind each other in the conveying direction z. These can be, for example, small-format belt drives, link chain drives or, in turn, omni wheels. The conveyor drives 2a are not combined in modules, but are, for example, permanently mounted on a carrier plate. Each conveyor drive 2a comprises a (individually) controllable motor (not shown), which can drive the respective conveyor drive individually at different velocities, in particular, both in the conveying direction z and against the conveying direction z. Due to the smaller dimensions of the conveyor drives 2a than a conveyed-good unit 11a, 11b, 11c, 11d, 11e, 11f, 11g, 11h or 11i, at least in the course of transport in the conveying direction z, the situation is always given that a conveyed good 11 rests on at least two conveyor drives 2a simultaneously. As a result, a movement at an angle to the conveying direction and not only in the conveying direction can be transmitted to the conveyed-good unit 11a, 11b, 11c, 11d, 11e, 11f, 11g, 11h or 11i due to the corresponding different drive velocity and/or different drive direction of the two affected conveyor drives 2a for establishing a target distance between the conveyed-good units.

In FIG. 1c, a further embodiment of a conveyor system 10 according to the invention is schematically shown in a top view. In contrast to the embodiments of FIGS. 1a and 1b, the embodiment of FIG. 1c shown has two parallel subsequent conveyor sections 16. In addition, the conveyor drives 2a, 2b of the first conveyor section 13 in this embodiment are each alternately parallel and transverse to the conveying direction z and also smaller than the contact surface of the conveyed-good units. As a result, an efficient individual movement can also be transferred at any angle to the conveying direction z in addition to the transport in the conveying direction to the individual conveyed-good units 11a, 11b, 11c, 11d, 11e, 11f, 11g, 11h, 11i for establishing a target distance between the units.

In FIG. 1d, a further schematic top view shows a further embodiment of the conveyor system 10 according to the invention. Here, two parallel subsequent conveyor sections 16 are also provided following the first conveyor section 13. In contrast to the previous embodiments of the conveyor drives 2, driven wheels 2a are provided in this embodiment, which can be rotated and/or fixed firmly on a carrier plate. In the case of a rotatable fixation, the conveyor drives 2a can, in particular, be rotatable in a controlled manner, for example, by means of another controllable motor (not shown), which, in addition to the motor drive for turning the wheel, is provided as a drive for the transport of the conveyed-good units 11a, 11b, 11c, 11d, 11e, 11f, 11g, 11h, 11i. Also in this embodiment, a movement of the conveyed-good units 2a can be carried out very efficiently not only in the conveying direction z but also in a variable manner at an angle to the conveying direction z. In this way, a target distance between the conveyed-good units 11a, 11b, 11c, 11d, 11e, 11f, 11g, 11h, 11i can be established reliably and in a variable manner over a very short distance.

FIG. 2 shows in more detail in a highly schematized sketch the principle of movement of establishing a target distance d between individual conveyed-good units 11 by means of the device according to the invention or by the method according to the invention. For a better overview, only the conveyed-good units 11 and their movement vectors are shown in a "before" and "after" snapshot in the first conveyor section of the conveyor system 10.

In the initial situation shown in FIG. 2a, the conveyed-good units 11 were supplied in bulk and were detected by the detection means for the typifying detection of the conveyed-good units. Together with the means for determining a target position of a conveyed-good unit, the control system has individually determined the directions of movement and movement strength for the individual conveyed-good units 11 for the generating the target distances between the conveyed-good units 11, which are schematically represented here on the basis of movement vectors and which are executed by corresponding control signals to the motors of the conveyor drives (not shown here). As shown, the conveyed-good units 11 are not only moved in the conveying direction z, but also individually at an angle to the conveying direction, wherein different conveying velocities, which are indicated here as the length of the vector arrows, are also provided. In this way, according to the invention, it is possible to generate the required target distances between most of the conveyed-good units 11 over a very short path of the first conveyor section, as shown in FIG. 2b after executing the movements shown in FIG. 2a. Now, no sufficient target distance exists between the two upper front conveyed-good units, which is still taken care of by a further movement as indicated by the movement vectors in FIG. 2b. All other conveyed-good units can be transported further in the conveying direction with adapted conveyor velocities (represented by the length of the vector arrows) since their distance from each other already corresponds to the target distance. It is therefore not mandatory that all target distances must be established in a first movement; a second or a plurality of other movement(s) can also be determined and executed during the course of transport to establish remaining target distances that are to be established.

In FIG. 3, consecutive snapshots of a method according to the invention for generating target distances are shown in four top views, which are also strongly schematized, between conveyed-good units 11 by means of a preferred embodiment of the conveyor system 10 according to the invention.

In FIG. 3a, conveyed-good units 11 are fed towards a first conveyor section 13 by means of a feeding device 12. The conveyed-good units 11 lie in a disorderly manner at sometimes very small distances from each other in "bulk" on the feeding device 12. In some cases, the conveyed-good units 11 can even come into contact with each other. The conveyor system 10 is provided to transport the conveyed-good units in the conveying direction z with an actual velocity v, as indicated as a movement arrow above, to a downstream conveyor section 16 (see FIG. 1). This illustrates the initial situation of the method according to the invention. All components of the conveyor system 10 shown only schematically can be designed as described above.

In FIG. 3b, the conveyed-good units 11 are shown at the end of the first conveyor section 13 facing the feed unit 12. Here, they are first typically detected, for example, by one or a plurality of sensors (not shown), wherein the typing can also take place in the previous section (cf., positions in FIG. 3a) and can be completed there as well as continued in the stage shown in FIG. 3b. On the basis of the detected typifying data, a target position is determined for each conveyed-good unit 11, which is usually carried out by software, for example by an algorithm or by a self-learning AI routine, in the control system.

Before determining the target position, a further step can follow by deciding whether a movement must be executed to produce a target position, and then the subsequently occurs:

in the event of a "yes" decision: calculating the movement direction and the strength of movement, or in the event of a "no" decision: transporting the conveyed-good unit without additional movement.

With the data of the typifying detection and the data of the target position, the control system is now able to send control signals to the conveyor drives (not shown) of the first conveyor section 13 in order to move the conveyed-good units 11 to their target positions, which initially carry out the transport of the conveyed-good units 11 at an actual velocity v.

In a subsequent section of the first conveyor section, signals are sent on the basis of the determined target positions, which both ensure the transport in the conveying direction z at an actual velocity v as well as trigger movements in different directions pointing at any angle to the conveying direction z and different movement strengths (length of the arrows 18) as shown in FIG. 3c by the movement arrows 18 for each conveyed-good unit 11.

FIG. 3c shows that, for the purpose of establishing target distances between the conveyed-good units 11, individual conveyed-good units 1 are moved using conveyor drives (not shown here, cf. the preceding embodiments, in particular, with regard to FIG. 1), which can move one or a plurality of conveyed-good units 11 in any direction of the conveying plane, this being in such a way that the target distances between the conveyed-good units 11 are moved at the latest when they are transferred to a subsequent conveyor section. In each case, the movement takes place depending on control signals generated from the typifying detection of the conveyed-good units 11 and the determination of the target positions of the conveyed-good units 11. As shown here by the movement arrows 18 for each conveyed-good unit 11, the movements for each conveyed-good unit 11 are carried out individually in different directions pointing at angles to the conveying direction z and also with different movement strengths (length of the arrows 18) by the device 10 according to the invention.

Finally, in FIG. 3d, the target distances between the conveyed-good units 11 are generated and the conveyed-good units 11 are accordingly transported in the conveying direction z with the actual velocity v, which can now be smaller but preferably equal to or greater than the input-actual velocity v, to the subsequent conveyor section 16 without changing their relative position to each other during this further transport.

FIG. 4 respectively outlines a highly schematized flow diagram of two embodiments of a method according to the invention.

FIG. 4a shows a highly schematized flow diagram of an embodiment of the method according to the invention.

At step S1, a typifying detection of the conveyed-good units takes place. Step 1 can already take place during the supply of the conveyed-good units or in a first subsection of the first conveyor section.

On the basis of the detected typifying data, a target position is determined for each conveyed-good unit at step S2, which is usually carried out by software, for example by an algorithm or by a self-learning AI routine, in the control system.

At step S3, a target distance d between individual conveyed-good units is controlled or regulated on the basis of the said target position. For this purpose, the individual conveyed-good units are moved using conveyor drives of the conveyed good, which can move one or a plurality of conveyed-good units in each direction of the conveying plane in such a way that the target distances d between the conveyed-good units are present at the time of the transition to a subsequent conveyor section. According to the invention, the movement takes place depending on control signals, which are generated from the typifying detection of the conveyed-good units and the determination of the target positions of the conveyed-good units.

At step S4, the movement of the conveyed-good units to generate the target distances is completed and the conveyed-good units are transported in the conveying direction to a subsequent conveyor section or transferred to it.

Before determining the target position in step S2, a further step S5 can follow by deciding whether a movement must be executed to create a target position, and then the following follows:
  in the event of a "yes" decision: calculating the direction and strength of movement as step S2, or
  in the event of a "no" decision: transporting the conveyed-good unit without additional movement as step S4.

FIG. 4b outlines an alternative embodiment of the method according to the invention. As an alternative or cumulative to the sequence shown in FIG. 4a, step S2, i.e., after determining the target position, can also be followed by a decision step S6, in which it is decided whether a movement must be executed to create a target position, in which the following is executed:
  Comparison of the calculated target position with a determined actual position of a conveyed-good unit,
  in the event of a difference between the actual position and the target position greater than a preset threshold value: continuing with step S3, i.e., controlling and regulating a target distance d between individual conveyed-good units on the basis of the said target position,
  in the event of a difference between actual position and target position less than a preset threshold value: transporting the conveyed-good unit without additional movement as step S4.

The invention claimed is:

1. A method for establishing distances between a first conveyed-good unit and a second conveyed-good unit during the simultaneous transport of the conveyed-good units in a conveying direction, comprising the following steps:
  feeding of a plurality of at least the first conveyed-good unit and the second conveyed-good unit in a first arrangement, wherein the first conveyed-good unit and the second conveyed-good unit are fed in sections simultaneously in the conveying direction, and wherein the conveyed-good units of the conveyed good are fed orthogonally offset to each other in relation to the conveying direction and have a first distance to one another,
  typifying detection of the conveyed-good units,
  determining a target position of the first conveyed-good unit and the second conveyed-good unit,
  controlling or regulating a target distance in any direction on a conveying plane between the first conveyed-good unit and the second conveyed-good unit on the basis of the said target position, and
  for this purpose, moving the first conveyed-good unit and the second conveyed-good unit using conveyor drives, the conveyor drives configured to move one or a plurality of conveyed-good units individually and in a variable manner in any direction of the conveying plane comprising both in the conveying direction and at a variable angle deviating from the conveying direction, in such a way that a target distance between the first conveyed-good unit and the second conveyed-good unit exists in any direction on the conveying plane at the point of transfer to a subsequent conveyor section, wherein the target distance is different from the first distance, the movement is dependent on control signals generated from the typifying detection of the first conveyed-good unit and the second conveyed-good unit and generated from the determination of the target positions of the first conveyed-good unit and the second conveyed-good unit, wherein the first conveyed-good unit and the second conveyed-good unit are transported simultaneously in the conveying direction.

2. The method according to claim 1, wherein a feeding device supplies a plurality of individual conveyed-good units in bulk.

3. The method according to claim 1, wherein the method, after the typifying detection of the first conveyed-good unit and the second conveyed-good unit and/or after determining the target positions of the first conveyed-good unit and the second conveyed-good unit, additionally comprises the following steps:

deciding whether a movement must be executed to reach a target position, then, in the case of a "yes" decision: calculating the movement direction and the strength of movement, in the event of a "no" decision: continuing to transport the conveyed-good unit without additional movement.

4. A conveyor system for establishing distances between a first conveyed-good unit and a second conveyed-good unit during the simultaneous transport of the conveyed-good units in one conveying direction, comprising:

a feeding device for feeding at least one first conveyed-good unit and the second conveyed-good unit, wherein the first conveyed-good unit and the second conveyed-good unit have a first distance, one or a plurality of subsequent conveyor sections with a plurality of conveyor drives positioned in the conveying direction one behind the other and next to each other for the transport of the conveyed-good units at an actual velocity, detection means for the typifying detection of the individual conveyed-good units, means of determining a target position of the first conveyed-good unit and the second conveyed-good unit, a control system/regulator for controlling or regulating a target distance in any direction on a conveying plane between of the first conveyed-good unit and the second conveyed-good unit on the basis of the said target position, wherein the conveyor drives are configured to move individually or jointly in a plurality the individual conveyed-good units in any direction on the conveying plane comprising both in the conveying direction and at a variable angle deviating from the conveying direction in such a way that the target distance between of the first conveyed-good unit and the second conveyed-good unit exists in any direction on the conveying plane at the point of its transfer to a subsequent conveyor section, wherein the target distance is different from the first distance, wherein the conveyor drives each are individually driven by a motor and individually controllable by the control system/regulator, and wherein:

the detection means is capable of sending a signal to the control system/regulator with information on the characteristics of the first conveyed-good unit and the second conveyed-good unit, the control-system/regulator receives signals from the means for determining a target position of the first conveyed-good unit and the second conveyed-good unit and, depending on these signals, generates and outputs control/regulating signals to the conveyor drives for moving the first conveyed-good unit and the second conveyed-good unit to the target position in such a way that the first conveyed-good unit and the second conveyed-good unit are capable of being individually moved in a variable manner in each direction on the conveying plane by the conveyor drives to establish the target distance in any direction on the conveying plane, wherein the first conveyed-good unit and the second conveyed-good unit are simultaneously transported in the conveying direction, wherein at least two rotational axes of the conveyor drives of a drive module are not arranged orthogonally to the conveying direction.

5. The conveyor system according to claim 4, wherein the conveyor drives are arranged in a plurality of drive modules so that one drive module comprises two or three or four conveyor drives.

6. The conveyor system according to claim 5, wherein the rotational axes of the conveyor drives of a drive module are either parallel or not parallel to each other.

7. The conveyor system according to claim 4, wherein the rotational axes of the conveyor drives of a drive module are not parallel and/or not orthogonal to the conveying direction.

8. The conveyor system according to claim 4, wherein the conveyor drives are smaller in dimension than the contact surface of a conveyed-good unit.

9. The conveyor system according to claim 4, wherein the conveyor drives are in groups cumulatively driven by one motor.

10. The conveyor system according to claim 4, wherein the conveyor drives of the first conveyor section are rotatably mounted.

11. The conveyor system according to claim 10, wherein the conveyor drives are capable of being individually rotated in a controlled manner.

12. The conveyor system according to claim 4, wherein the detection means for the typifying detection of the conveyed-good units are sensors, light barriers, cameras, photodiodes, radar devices, ID readers for reading printed codes or combinations thereof.

13. The conveyor system according to claim 4, wherein the means for determining a target position of a conveyed-good unit are a computer-program product.

14. The conveyor system according to claim 4, wherein the control system/regulator for controlling or regulating a target distance between individual conveyed-good units on the basis of the said target position, comprises control signals to at least two adjacent, adjacent conveyor drives.

15. The conveyor system according to claim 4, wherein the conveyor system comprises means of verifying the target distances achieved.

* * * * *